United States Patent [19]

Sutcliffe

[11] Patent Number: 4,734,878

[45] Date of Patent: Mar. 29, 1988

[54] CIRCUIT FOR PERFORMING SQUARE ROOT FUNCTIONS

[75] Inventor: Patrick L. Sutcliffe, Citrus Heights, Calif.

[73] Assignee: General Electric Company, Milwaukee, Wis.

[21] Appl. No.: 794,094

[22] Filed: Oct. 31, 1985

[51] Int. Cl.⁴ ............................................. G06F 7/552
[52] U.S. Cl. .................................................. 364/752
[58] Field of Search .................. 364/752, 814; 377/39, 377/49

[56] References Cited

U.S. PATENT DOCUMENTS

| | | | |
|---|---|---|---|
| 3,280,314 | 10/1966 | Weigler | 364/752 |
| 3,576,983 | 5/1971 | Cochran | 364/752 |
| 3,829,672 | 8/1974 | Sather | 364/752 |
| 3,906,210 | 9/1975 | Mignot | 364/752 |
| 4,336,599 | 6/1982 | Wong | 364/752 |

Primary Examiner—Gary V. Harkcom
Assistant Examiner—Tan V. Mai
Attorney, Agent, or Firm—Flehr, Hohbach, Test, Albritton & Herbert

[57] ABSTRACT

Circuitry for computing the square root of a number wherein the input number is partitioned into digit pairs left and right of the radix point. Pairs of zeros are added after the radix point for each digit of the desired precision. The most significant zero digit pairs are skipped to the first digit pair which is not zero, accordingly the first answer bit is a 1. A residue is formed by subtracting the 1 from the digit pair, multiplying by 4, and adding the next most significant digit pair. The procedure is repeated for subsequent bit pairs by defining trial divisors and determining residue values.

4 Claims, 7 Drawing Figures

```
                                1   1   3   1   3   7
   1                         √‾01, 28. 00, 00, 00, 00
   2                           | 1
   3          21                 0 28
   4                              21
   5          223               | 7 00
   6                              6 69
   7          2261              |  31 00
   8                              22 61
   9          22623             | 8 39 00
  10                              6 78 69
  11          226267            |1 60 31 00
  12                             1 58 38 69
  13                                1 92 31
```

LONGHAND DECIMAL COMPUTATION OF SQUARE ROOT
SORT (128) = 11.31370850

LONGHAND BINARY COMPUTATION OF SQUARE ROOT
SORT (1000 0000) = 1011.01010000
1011.01010000$_2$ = 11.3125$_{10}$

FIG. — 2

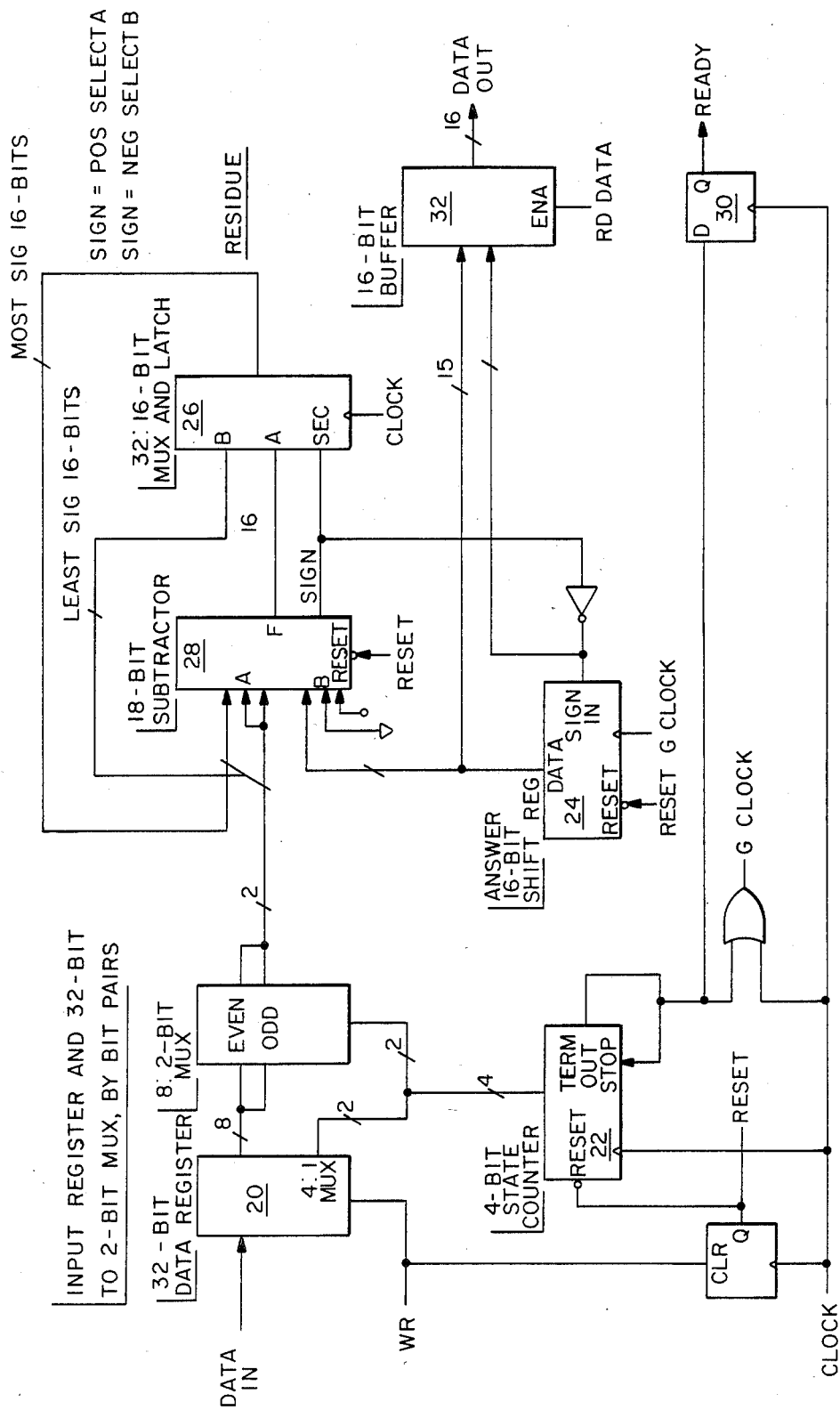
FIG.—3

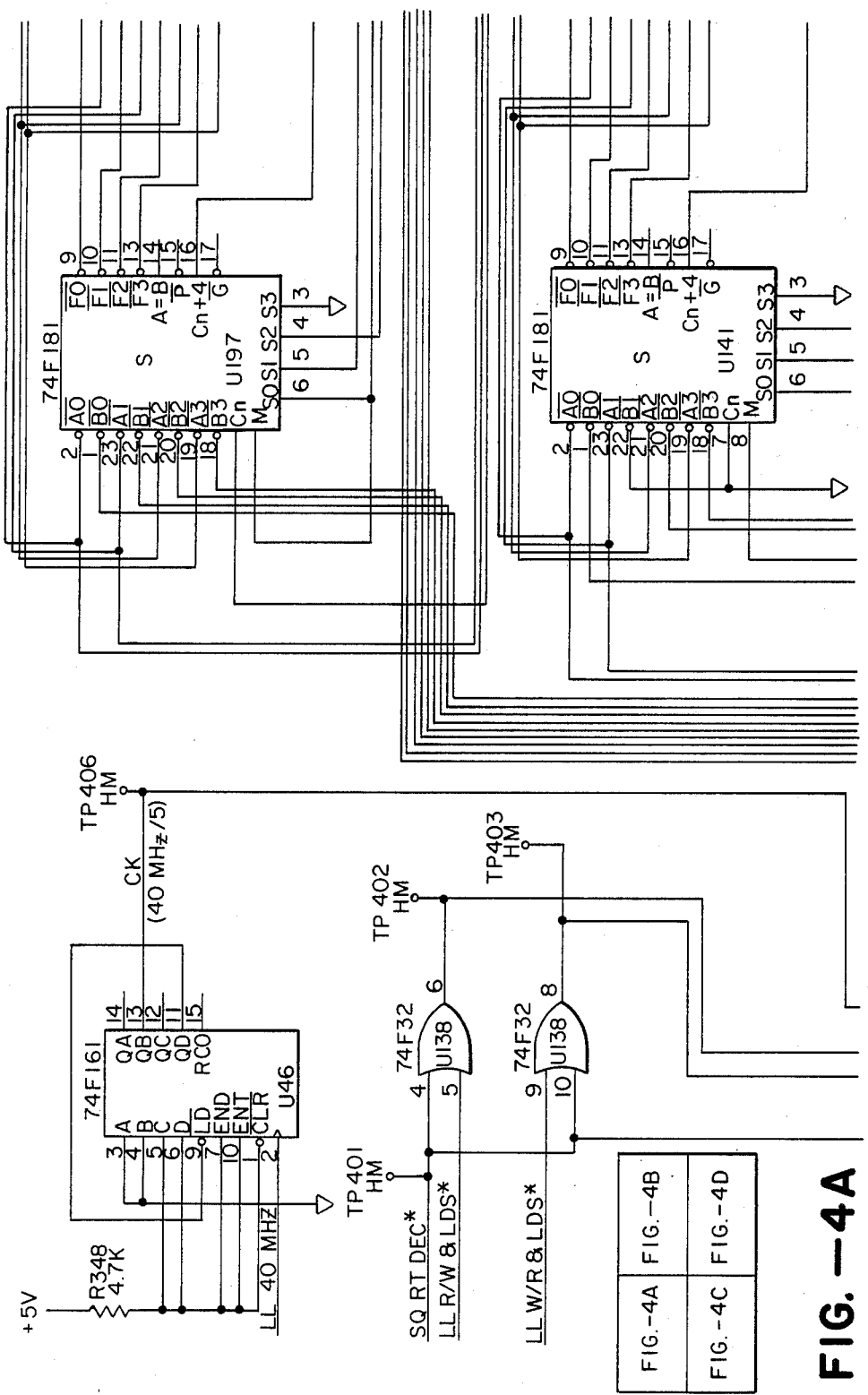

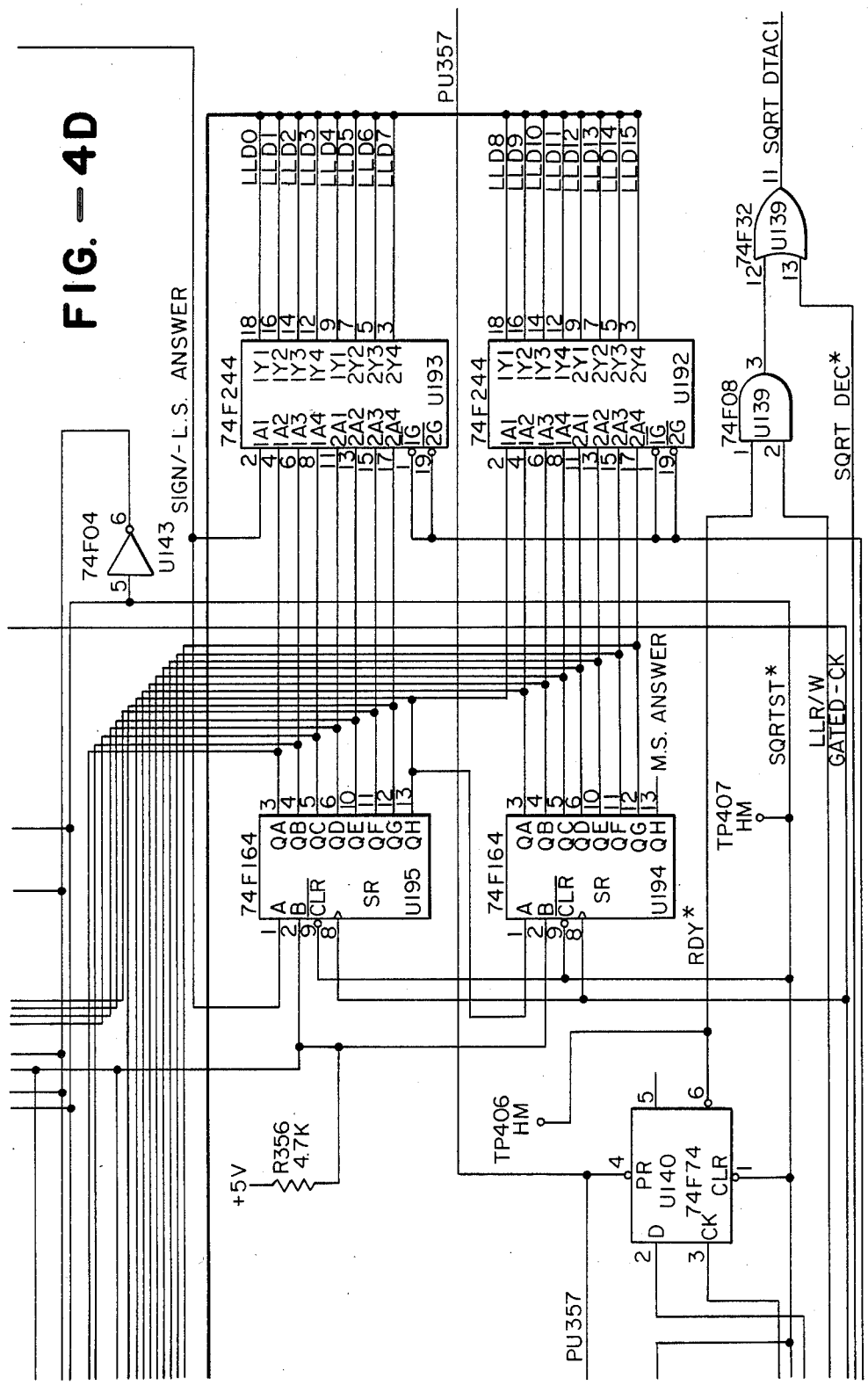
FIG.—4D

CIRCUIT FOR PERFORMING SQUARE ROOT FUNCTIONS

BACKGROUND OF THE INVENTION

This invention relates generally to circuitry for implementing mathematical calculations, and more particularly the invention relates to circuitry for performing square root operations.

In processing electrical signals in an ultrasonic phased array sector scanner to obtain focused imaging, the time delay differences between transducer elements in receiving reflected ultrasonic waves at a specific focal depth and beam angle must be calculated. The general equations describing total time delay requires obtaining the square root of a function of the beam angle, focal depth, and transducer element in the array.

A number of known techniques for performing square root functions are not feasible in such an application because of the time requirements in carrying out the calculations. For example, a high level language computation requiring a plurality of multiplication and addition steps is too slow. Another alternative is the use of software tables, but such tables involve a very large number of bytes and cannot be as general as required since each frequency, depth, and transducer configuration requires about 56,000 bytes. Thus, calculations for only a two transducer array with eleven depths and three frequencies requires about 3.7 megabytes of storage. Further, use of a software table does not readily permit the use of arbitrary focal depths as might be desirable with range gated pulse echo doppler.

Hardware integrated circuits which directly perform square roots are quite limited, and the fastest product (Intel 8087) requires about 36 microseconds justifying the floating points. Moreover, the required usage of floating point numbers would further slow the other necessary computations.

Other alternatives include the use of a software algorithm in which a first guess is made reasonably good by using a table lookup. However, such a technique would require a divide, add, and multiply to compute the square root and the procedure would be more time consuming than desired. Alternatively, the square root can be approximated using a common polynomial based on a Taylor series expansion. The accuracy of the approximation depends on the number of terms used and again is more time consuming than desired for a sector scanner application.

Yang, "Gate Array for Square Root Chip Meets Military Systems Needs", pg. 167–174 *EDN* Aug. 23, 1984 derives square roots by describing the input number as a succession of partial remainders, each one functioning on the remainder before. The gate array circuitry ripples the calculations to a final result. While the circuitry is fast in implementing the square root function, the circuitry is complex and requires substantial power.

In accordance with the present invention circuitry is provided which performs the square root function in a time period which is compatible with ultrasonic sector scan applications and which does not require substantial electrical power. For example, the 1/32 of a wavelength requirement at 7.5 megahertz implies a resolution of 1/156 millimeter. This requires eight bits (1/256) of precision. For focal depths from one millimeter to less than 250 millimeters, the interger part of the range can be obtained in eight bits (less than 1/256) also, A circuit in accordance with the invention designed to find a square root with 16 bits of precision, with a radix point assumed between bits eight and nine, implies that the input number has 32 bits of precision.

SUMMARY OF THE INVENTION

The circuit in accordance with the invention is based on a simple algorithm for computing the square root of a number in longhand. First, the input number is partitioned into digit pairs left and right of the radix point. Pairs of zeroes are added after the radix point for each digit of the desired precision. Next, the most significant zero digit pairs are skipped to the first digit pair which is not zero. Accordingly, the first answer bit is a one. A residue is formed by subtracting the one from the digit pair, multiplying by four, and adding the next most significant digit pair. The procedure is repeated for subsequent bit pairs by defining trial devisors and determining residue values. Advantageously, the algorithm implemented by the circuitry can be defined to place much of the operation within a loop.

BRIEF DESCRIPTION OF THE DRAWING

The invention and objects and features thereof will be more readily apparent from the following detailed description and appended claims when taken with the drawing, in which:

FIG. 1 is a longhand decimal computation of a square root.

FIG. 2 is a longhand binary computation of a square root.

FIG. 3 is a functional block diagram of circuitry in accordance with the invention for performing a square root function.

FIGS. 4A–4D are electrical schematics of one embodiment of the circuitry of FIG. 3.

DESCRIPTION OF THE PREFERRED EMBODIMENTS

Figure 4B:
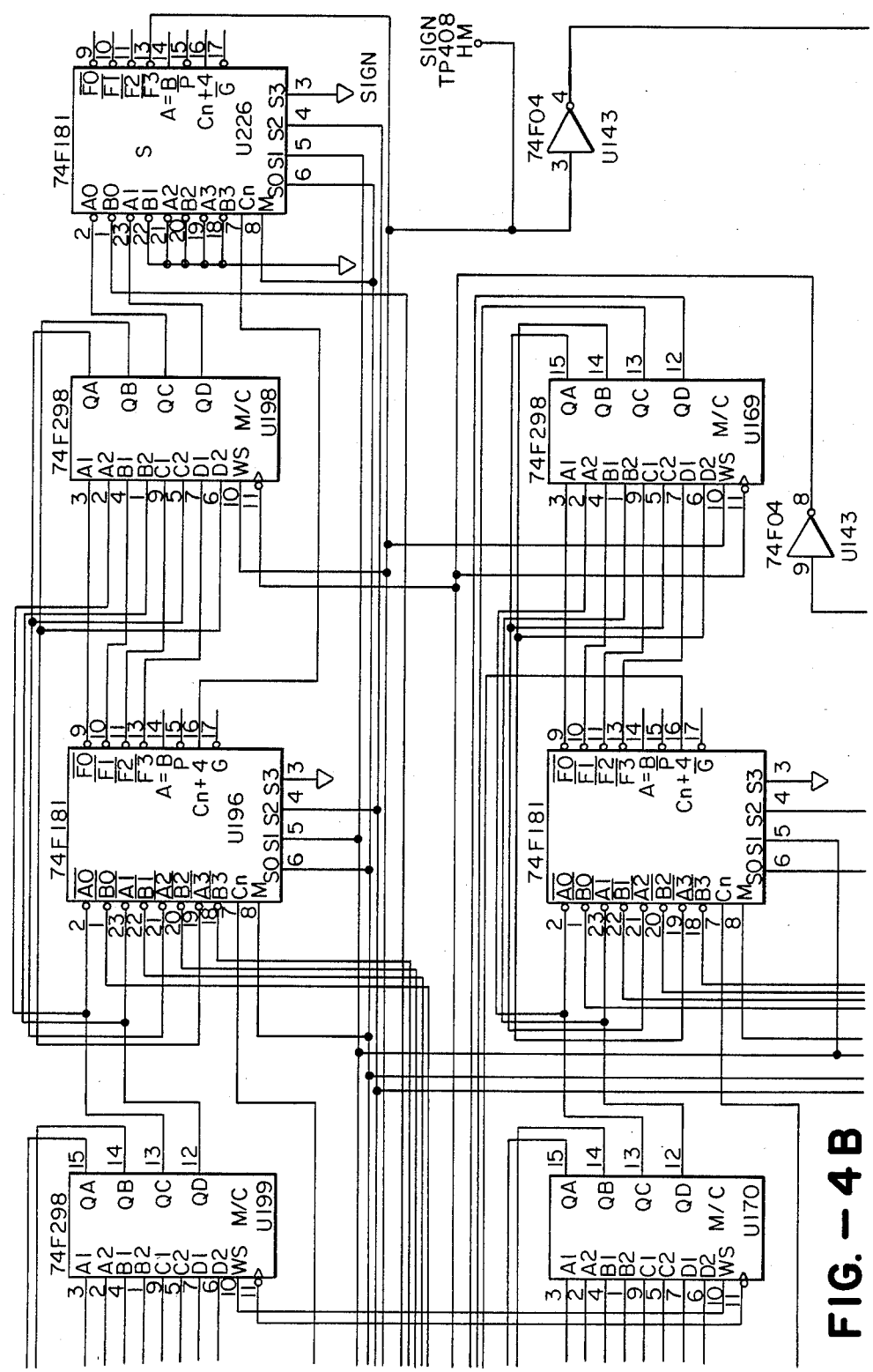

Referring now to the drawings, FIG. 1 illustrates the steps in finding the decimal square root of a number such as 128 using a simple algorithm on which the present invention is based. The steps in carrying out the algorithm can be described as follows:

(a) Partition the input number into digit pairs, left and right of the decimal point. Add zeros to the fraction until the total number of digit pairs right of the decimal point equals the precision sought.

(b) Find the largest square root in the most significant digit pair. This digit becomes the first (most significant) digit of the answer.

(c) Form a residue by subtracting the square of this digit from the digit pair, multiplying the result by 100 and adding the next most significant digit pair (line 3).

(d) Form a trial divisor=(answer * 20)+digit, where digit is such that trial divisor * digit is less than or equal to the residue (line 3).

(e) Subtract the trial divisor * digit from the residue (line 4), multiply the result by 100 and add the next digit pair (line 5) to form a new residue. Thus residue=(-residue−trial divisor * digit) * 100+digit pair.

(f) Next digit of answer is the digit found in step (d) Thus answer=(answer * 10)+digit. (g) Repeat step d. to step f. until sufficient digits have been found (lines 5 to 13).

The same algorithm can be applied to a binary number with the steps being somewhat easier to implement.

Referring to FIG. 2 the binary square root of an integer can be described as follows:

(a) Partition the input number into digit pairs left and right of the radix point. Add pairs of zeros after the radix point for each digit of the desired precision. (line 1).

(b) The first digit pair is not zero (here the most significant zero digit pairs have been skipped) so the first answer bit is 1 (the biggest square root in a binary digit pair can only be 0 or 1).

(c) Form a residue by subtracting 1 (the answer) from the digit pair, multiplying by 4 ($100_2$) and adding the next most significant digit pair (line 3).

(d) Form a trial divisor by taking the answer times 4 plus 1 (line 3).

(e) If the residue is less than the trial divisor, the next answer bit is zero, otherwise the answer bit is one. If the answer bit is zero, then find a new residue=residue * 4+next digit pair, otherwise the residue=(residue−trial divisor) * 4+next digit pair. New answer=answer * 2+answer bit (lines 4 and 5).

(f) Repeat steps (d) and (e) until all desired digits of the answer have been found (lines 6 to 14).

The algorithm described above with reference to FIG. 2 can be restated to place more of the operation within a loop as follows:

Let R=residue, A=most significant bits of answer, A0=least significant bit of answer, T=trial divisor, RI=residue input to subtractor, Count=loop count, and Q=input number let A=0, R=0 and Count=0 and Select most significant 2 bits of Q Loop:
RI=R * 4+2 bits of Q  T=A * 4+1 if RI>=T then
  R=RI−T
  A0=1
else
  R=RI
  A0=0
end if
if Count=15 then stop. Answer=A * 2+A0
Count=Count+1
Select next most significant 2 bits of Q
A=A * 2+A0
go to Loop ! repeat for all pairs A circuit for implementing the algorithm described above in accordance with the invention is illustrated in FIG. 3. Data is written to a 32-bit Data Register 20. During the write a reset circuit is cleared to generate Reset to initialize each portion of the square root circuit. The 4-bit State Counter 22 is set to zero, the Answer shift register 24 is cleared, and the Residue latch 26 is cleared by zeroing the output of the 18-bit Subtractor 28 and allowing the Residue latch to capture the zero value. While the Subtractor is cleared, the Sign is also zeroed, selecting the Subtractor inputs to the Residue latch.

The Data register section of the circuit selects the 2 bits of the input data (Q in the above algorithm) to be added to the residue. Based on the State counter, one of 16 pairs of bits is selected, beginning with the most significant bit pair (bits 32 and 31). The State counter sets a terminal count output which is used to gate the circuit Clock. This gated clock, GCLK, clocks the Answer shift register and the Residue latch until the final state is reached.

The A inputs to the 18-bit Subtractor consist of the 2 data bits from Q and the 16 bits from the last residue, which is the output of the Residue latch. Note that using the 16 bits of the residue as the upper 16 of the 18-bit input in effect multiplies the Residue value by 4 and adds the 2 bits of Q, resulting in the value of RI in the above algorithm.

The B inputs to the Subtractor consist of the last answer (in the Answer shift register—shifted up 2 bits (to effect the multiply by 4), added to a constant lower 2 bits equal to 1. The B inputs are thus the value of T in the above algorithm.

The result of the subtraction, which is the value RI−T, will be either positive or negative. If the result is positive, the decision RI>=T is true (since RI−T>=0), and the sign bit will be 0, selecting the Subtractor outputs as inputs to the Residue latch and setting the A0 bit equal to 1. If the result is negative, the sign will be 1 and the A0 bit will be set to 0. The Residue latch will select as input the least significant 16 bits of RI.

At the next GCLK the Residue latch will be updated to the new residue and the Answer shift register will shift the old answer up one bit and shift in the A0 bit. The significant bits of the next answer, in which the new answer equals A0 plus two times the Answer shift register.

When the terminal count is reached by the State counter, the output Ready at 30 becomes true one clock later. This delay allows the circuit to determine the final bit of the answer before a read of the output Buffer 32 will represent a valid square root.

Figure 4C:
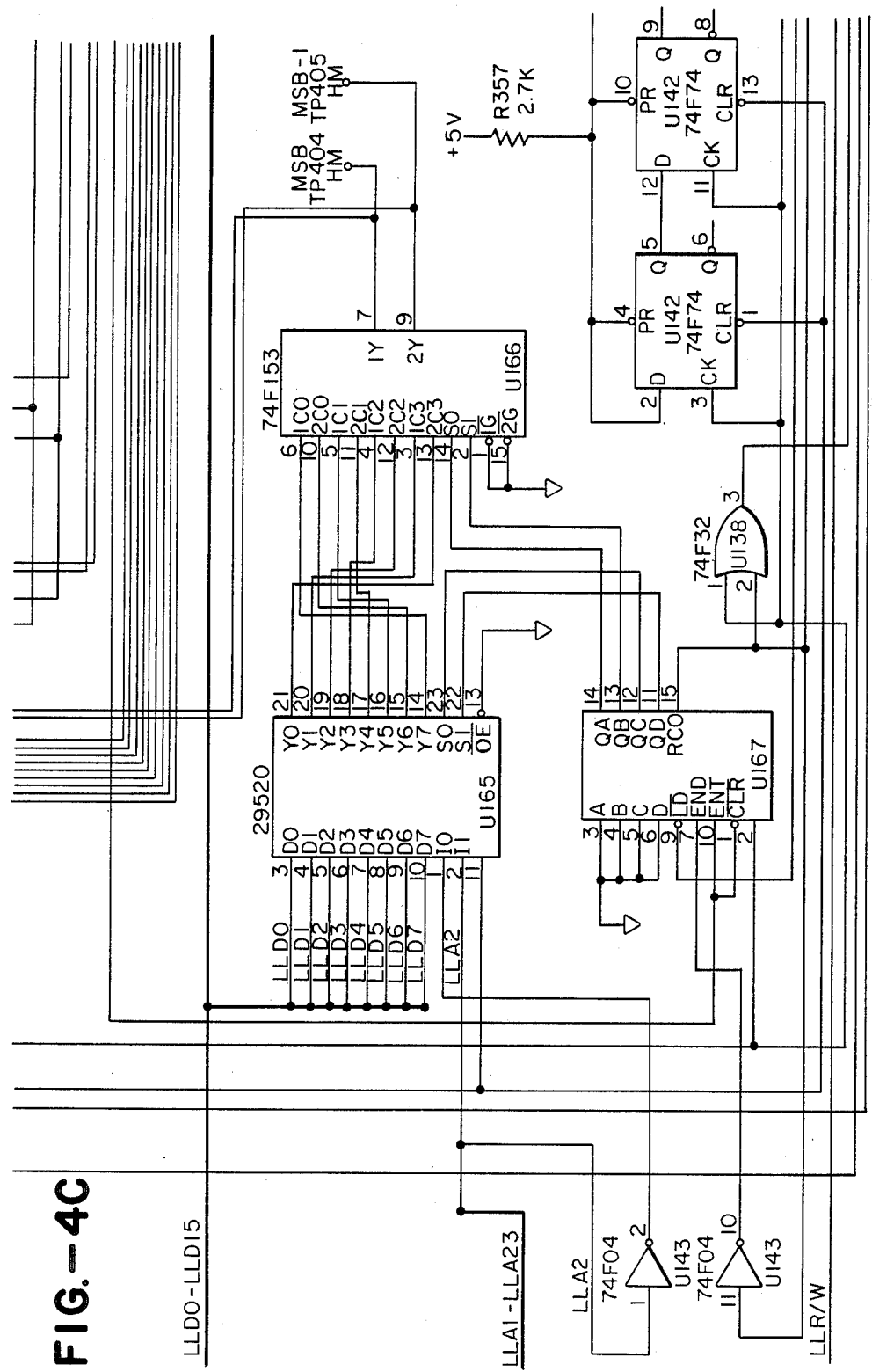

FIGS. 4A-4D are schematics of one circuit for implementing the functional block diagram of FIG. 3. The input data register resides in U165, which is a multiplexed input/multiplexed output quad 8-bit register. Two lines select one of four registers. U166 uses another two lines to select one of four even and one of four odd bits from U165 to form the selected bit pair of Q described above. The counter U167 acts as the state counter, starting at zero and stopping at a count of 15. One gate of U138 acts to gate the clock (CK) to form GCLK (GATED-CK), active while terminal count of U167 is low and forced off when the terminal count goes high.

The flip-flops of U142 form the Reset control. During any write to U165, these flip-flops are cleared, causing the Reset output (SQRTRST*) to be zeroed. Following the fourth write to U165, Reset will stay at zero until the second clock (CK). This assures that the reset period is at least one clock period long, and it assures that the Subtractor can be cleared long enough for the inputs to the Residue latches to be valid at the second clock.

The counter U46 provides the clock (CK) by dividing 40 MHz by some small integer. The nominal divisor is 5, providing a 125 nanosecond clock period. The counter is loaded to a count of 12, and counts up through 13, 14, 15, to 0. The count of 0 causes a reload of the counter to 12, thus providing 5 states. The Qb output is used to provide a clock cycle of 2 highs and 3 lows to assure the minimum clock width exceeds the needs of various components within the square root circuit.

The subtractor consists of the 5 devices U141, U168, U197, U196 and U226. These ALU's (Arithmetic Logic Units) are configured to subtract with a ripple carry/-borrow. This method is slightly slower than if carry look-ahead is used, but it saves 1 to 2 additional integrated circuits. Two 74LS182s or a 74LS882 integrated circuit could be used, which would decrease the timing to allow the circuit to operate at 10 MHz (100 nanosecond cycle period), but in this application the small savings does not seem to warrant the additional devices. The ALU's have 16 modes of operation, of which two are used. One mode zeros the outputs, and one mode sets the outputs to the difference of the A and B inputs. U226 provides only the sign of the subtraction result.

The Residue latches consist of U170, U169, U199 and U198. These devices are 4-bit 2-to-1 multiplexed input latches. A low on the select input presents the ALU outputs to the latch.

The Answer shift registers are U195 an U194. The inversion of the Sign is the serial input to U195, and the eighth output acts as the serial input to U194. Together these two devices provide a 16-bit serial shift register with parallel outputs.

U193 and U192 provide the output Buffers for the answer. They are enabled during Data reads. The Ready output comes from U140. This flip-flop delays the terminal count of U167 by one clock period. The output Ready not (RDY*) is used to delay the data read termination until the square root circuit actually completes the final bit determination.

The complete square root determination takes about 18 clock cycles. One to two are used for reset and 16 are used for evaluating each of the bits of the answer. At 8 MHz, the time required for one square root is about 2.3 microseconds, ignoring the time needed to write and read data. In one sector scanner application, write and read time is about 4.4 microseconds minimum. The evaluation of the algorithm can be written to interlace the computations, such that during the time required for the square root evaluation, the processor can be busy finishing the previous computation. Using this technique the time delay needed for the square root can be made to be practically transparent, since enough other computations can be done to occupy the time. The complete evaluation of the general equation referenced above then takes an average time of about 26 microseconds per value, for a program written in assembly code.

There has been described a circuit based on discrete digital components which timely computes the square root of numbers for use in such applications as a phased array sector scanner. While the invention has been described with reference to a specific circuit, the description is illustrative of the invention and is not to be construed as limiting the invention. For example, the difference of RI and T could be computed by realizing that $RI - T = RI + (T/ + 1)$, where $T/ = $ 1's complement of T But $T = 4*A + 1$, so $RI - T = RI - 4*A - 1$ $= RI + (4*A)/ + 1 - 1$ $= RI + (4*A)/$ where $(4*A)/$ is the 1's complement of the upper bits of the answer. Thus the difference could be obtained using adders instead of subtractors, if the outputs of the Answer shift register were inverted. Accordingly, various modifications and applications may occur to those skilled in the art without departing from the true scope of the invention as defined by the appended claims.

What is claimed is:

1. Circuitry for performing square root functions comprising
   a data register for an input number,
   a state counter,
   an answer shift register having an input and an output,
   a loop including a subtractor having two inputs and an output, a latch connected to said subtractor output and to one of said subtractor inputs, means connecting said subtractor output to said input of said answer shift register, and means connecting said output of said answer shift register to the other of said subtractor inputs,
   means connecting data bit pairs stored in said data register to said one of said subtractor inputs, said data bit pairs being selected in response to said state counter and concatenated with data from said latch to form concatenated data as one input to said subtractor from which data from said answer shift register is subtracted, and
   said latch receiving an output signal from said subtractor and said answer shift register receiving a "1" bit when said concatenated data is equal to or greater than data from said answer shift register, said latch receiving the concatenated data and said answer shift register receiving a "0" when said concatenated data is less than data from said answer shift register, said loop operating on data until a terminal count is reached by said state counter.

2. Circuitry as defined by claim 1 wherein data from said answer shift register is shifted up two bits before application of said data as an input to said subtractor.

3. Circuitry as defined by claim 1 wherein data pairs from said data register are concatenated as the least significant bits.

4. Circuitry as defined by claim 1 and further including an output buffer connected to receive data from said answer shift register as a square root upon said state counter reaching a terminal count.

* * * * *